United States Patent
Strulovici et al.

(10) Patent No.: US 8,239,587 B2
(45) Date of Patent: Aug. 7, 2012

(54) DEVICE HAVING DATA SHARING CAPABILITIES AND A METHOD FOR SHARING DATA

(75) Inventors: Ilan Strulovici, Kiryat Motzkin (IL); Erez Arbel-Meirovich, Yahud (IL); Stefania Gandal, Hertzelia (IL); Adi Katz, Ramat Gan (IL)

(73) Assignee: Freescale Semiconductor, Inc., Austin, TX (US)

( * ) Notice: Subject to any disclaimer, the term of this patent is extended or adjusted under 35 U.S.C. 154(b) by 800 days.

(21) Appl. No.: 12/161,524

(22) PCT Filed: Jan. 18, 2006

(86) PCT No.: PCT/IB2006/050179
§ 371 (c)(1),
(2), (4) Date: Jul. 18, 2008

(87) PCT Pub. No.: WO2007/083197
PCT Pub. Date: Jul. 26, 2007

(65) Prior Publication Data
US 2010/0228894 A1    Sep. 9, 2010

(51) Int. Cl.
*G06F 13/28* (2006.01)
(52) U.S. Cl. .......................... 710/22; 711/147
(58) Field of Classification Search .......................... None
See application file for complete search history.

(56) References Cited

U.S. PATENT DOCUMENTS

| | | | |
|---|---|---|---|
| 4,502,117 A | 2/1985 | Kihara | |
| 4,556,952 A | 12/1985 | Brewer et al. | |
| 5,450,551 A | 9/1995 | Amini et al. | |
| 5,603,050 A | 2/1997 | Wolford et al. | |
| 5,692,216 A | 11/1997 | Wolford et al. | |
| 5,838,993 A | 11/1998 | Riley et al. | |
| 5,860,126 A * | 1/1999 | Mittal | 711/167 |
| 5,884,095 A | 3/1999 | Wolford et al. | |
| 6,041,060 A | 3/2000 | Leichty et al. | |
| 6,122,679 A | 9/2000 | Wunderlich | |
| 6,298,396 B1 | 10/2001 | Loyer et al. | |
| 6,542,940 B1 | 4/2003 | Morrison et al. | |
| 6,728,795 B1 | 4/2004 | Farazmandnia et al. | |
| 6,738,881 B1 | 5/2004 | Olivier et al. | |
| 7,200,689 B2 * | 4/2007 | Kahle | 710/22 |
| 2004/0024647 A1 | 2/2004 | Cheung | |
| 2004/0037156 A1 | 2/2004 | Yoneda et al. | |
| 2004/0073721 A1 | 4/2004 | Goff et al. | |
| 2004/0148447 A1 * | 7/2004 | Conrad et al. | 710/200 |
| 2005/0027899 A1 | 2/2005 | Kahle | |
| 2007/0094431 A1 * | 4/2007 | Fachan | 710/200 |

(Continued)

FOREIGN PATENT DOCUMENTS

EP    1182564 A    2/2002

(Continued)

*Primary Examiner* — Elias Mamo

(57) ABSTRACT

A method and device for sharing data. The method include: receiving, by a direct memory access controller, a data read instruction; wherein the read data instruction can be a shared data read instruction or a non-shared data read instruction; determining whether to fetch a requested data block from a first memory unit to a second memory unit by applying a direct memory address control operation; wherein the second memory unit is accessible by a processor that generated the shared data read instruction; fetching the requested data block from the first memory unit to the second memory unit by applying a direct memory access control operation, if the read data instruction is a non-shared data instruction or if the read data instruction is a shared data instruction but the requested data is not stored in the second memory unit; and retrieving a requested data block from a second memory unit.

18 Claims, 9 Drawing Sheets

FOREIGN PATENT DOCUMENTS

| | | |
|---|---|---|
| JP | 02048757 A2 | 2/1990 |
| JP | 04324755 A2 | 11/1992 |
| JP | 06187284 A2 | 7/1994 |
| JP | 07168741 A2 | 7/1995 |
| JP | 08249267 A2 | 9/1996 |
| JP | 2004013395 A2 | 1/2004 |
| JP | 2004252533 A2 | 9/2004 |
| WO | 2005013084 A2 | 2/2005 |

\* cited by examiner

DEVICE HAVING DATA SHARING CAPABILITIES AND A METHOD FOR SHARING DATA

FIELD OF THE INVENTION

The invention relates to a device having data sharing capabilities and for a method for sharing data.

BACKGROUND OF THE INVENTION

The complexity of integrated circuits has dramatically increased during the last decade. System-on-chip and other multiple-core integrated circuits are being developed in order to support various applications such as but not limited to multimedia applications, real time applications and the like.

Modern integrated circuits are capable of executing a large amount of tasks substantially in parallel. Some of these tasks require a transfer of relatively large amounts of data between memory mapped devices. A Multiple-channel Direct Memory Access (DMA) controller can manage multiple data transfers while reducing the load from the integrated circuit cores (processors).

The following patents and patent applications, all being incorporated herein by reference, describe various DMA controllers: U.S. Pat. No. 6,738,881 of Olivier et al, U.S. Pat. No. 6,122,679 of Wunderlich, U.S. Pat. No. 5,450,551 of Amini et al., U.S. Pat. No. 6,728,795 of Farazmandnia et al., U.S. Pat. No. 4,502,117 of Kihara, U.S. Pat. No. 4,556,952 of Brewer et al., U.S. Pat. No. 5,838,993 of Riley at el., U.S. Pat. Nos. 5,692,216, 5,603,050 and 5,884,095 of Wolford et al., U.S. Pat. No. 6,298,396 of Loyer et al., U.S. Pat. No. 6,542,940 of Morrison et al., U.S. Pat. No. 6,041,060 of Leichty et al., U.S. patent applications serial number 2004/0073721A1 of Goff et al, U.S. patent applications serial number 20040037156A1 of Takashi et al., U.S. patent application publication number 2004021618A1 of Cheung, Japanese patent publication number JP07168741A2 of Hedeki et al., Japanese patent publication number JP06187284A2 of Masahiko, Japanese patent application publication number JP2004252533A2 of Yoshihiro, Japanese patent publication number JP0432-4755A2 of Tadayoshi et al., Japanese patent application publication number JP2004013395A2 of Hiroyuki, Japanese patent application publication number JP08249267A2 of Tetsuya, Japanese patent publication number JP02048757A2 of Katsuyuki et al., and PCT patent application publication number WO2005/013084 of Simon et al.

DMA controllers are required to operate at ever growing rates. Data retrieval operations, especially from relatively slow or busy memory units is time consuming. In some cases the same data is required for different DMA channels. Statistically, a DMA controller can performs multiple time-consuming fetch operations of substantially the same data.

There is a need to provide efficient devices and methods for performing efficient direct memory access operations.

SUMMARY OF THE PRESENT INVENTION

A device having data sharing capabilities and for a method for sharing data method for, as described in the accompanying claims.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

The invention provides a device. The device includes a first memory unit, at least one processor that is adapted to access a second memory unit and a direct memory access controller. The direct memory access controller is adapted to: (i) receive a data read instruction, wherein the read data instruction can be a shared data read instruction or a non-shared data read instruction; (ii) determine whether to fetch a requested data block from a first memory unit to a second memory unit by applying a direct memory address control operation; and (iii) fetch the requested data block from the first memory unit to the second memory unit by applying a direct memory access control operation, if the read data instruction is a non-shared data instruction or if the read data instruction is a shared data instruction but the requested data is not stored in the second memory unit.

According to various embodiments of the invention the direct memory access controller is adapted to perform at least one of the following operations: (a) check a value of a shared data read instruction field, (b) check a match between a physical address associated with the requested data block and a physical address associated with shared data blocks that are stored within the second memory unit, (c) check if a number of entities that concurrently share a requested data block exceeds an entity threshold, (d) determine whether to reject the data transfer instruction, and in response to this determination reject the execution of the data read instruction, (e) receive shared data write instructions, (f) monitor an execution of the shared data read instructions and the shared data write instructions, and (g) limit a time difference between a reception of a shared data read instruction and a completion of a corresponding shared data write instruction.

The following description refers to various physical memory addresses. It is noted that an address can be an offset from a certain base address or the full address.

The DMA controller has a relatively small CAM memory that stores addresses associated with shared data blocks. It has a relatively simple and small sized associated logic that allows to track after the usage of shared data blocks, as well as an optional watchdog logic and counters that limits the usage period of shard data blocks. This structure is much simpler and more cost effective than cache memories that include a highly complex logic.

Conveniently, the processors that use the shared data enforce shared data alteration policies. The policy can prevent altering shared data blocks, enable different tasks to alter different portions of the shared data block, enable alteration by a single task, and the like.

Figure 1:
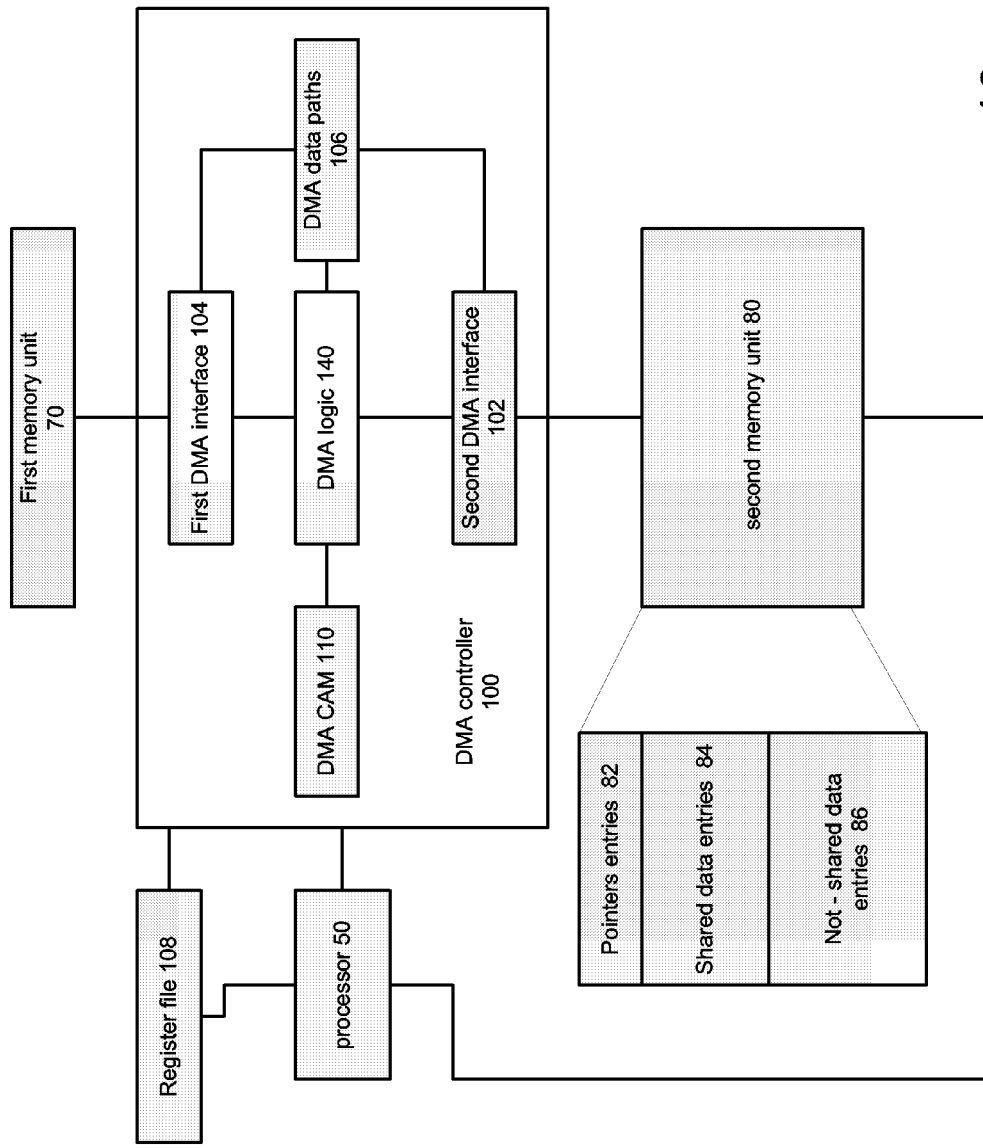
FIG. 1 illustrates a device, according to an embodiment of the invention.

FIG. 1 illustrates a device 10 according to an embodiment of the invention. Device 10 includes a processor 50, a first memory unit 70, a DMA controller 100 and second memory unit 80. The DMA controller 100 is connected to processor 50 and to first and second memory units 70 and 80.

Conveniently, the DMA controller 100 is connected to (or can even include) a register file 108 that stores various information such as a default value of watchdog counters, base addresses of various memory spaces within the second memory unit 80 (and optionally base addresses of various memory spaces within the first memory unit 70). The register file 108 can belong to processor 50.

The first memory unit 70 can be larger and even slower than the second memory unit 80. The first memory unit 70 can be an external memory unit while the second memory unit 80 can be integrated with the DMA controller 100. It is noted that multiple processors as well as multiple memory units of the first and second types can be connected to DMA controller 100.

The processor 50 can access the second memory unit 80, conveniently without needing to execute a direct memory access operation. The retrieval of data blocks stores within the second memory unit 80 is much faster than the fetching of data blocks from the first memory unit. The overall throughput of device 10 can be increased if data that was fetched to the second memory unit 80 is used by different tasks (such as different procedures, functions of instruction groups) executed by processor 50.

The second memory unit 80 includes multiple entries. These entries can include pointers entries 82, shared data entries 84 and non-shared data entries 86. It is noted that each group of entries can form a consecutive memory space but this is not necessarily so.

The shared data entries 84 can store multiple data blocks. These data blocks are pointed by pointers stored within the pointers entries 82. By using pointers various tasks can share the same data blocks while using different destination (in shared data read instructions) or source (in shared data write instructions) addresses. These pointers are stored in the destination addresses included within the shared data read instructions.

The DMA controller 100 includes a first DMA interface 104, a second DMA interface 102, DMA data paths 160, DMA logic 140 and DMA CAM 110. The DMA logic 140 is connected to components 102, 104, 110 and 160. The DMA logic 140 controls the operation of the DMA controller 100. It can determine if a received data read instruction is a shared data read instruction or not, access the DMA CAM 110 to determine if the requested data block is stored in the shared data entries 84 of the second memory unit 80, selectively control the transfer of data from the first memory unit 70 and to the first memory unit 70, and the like.

The functionality of the various components of DMA controller 100 will be further illustrated below.

Figure 2:
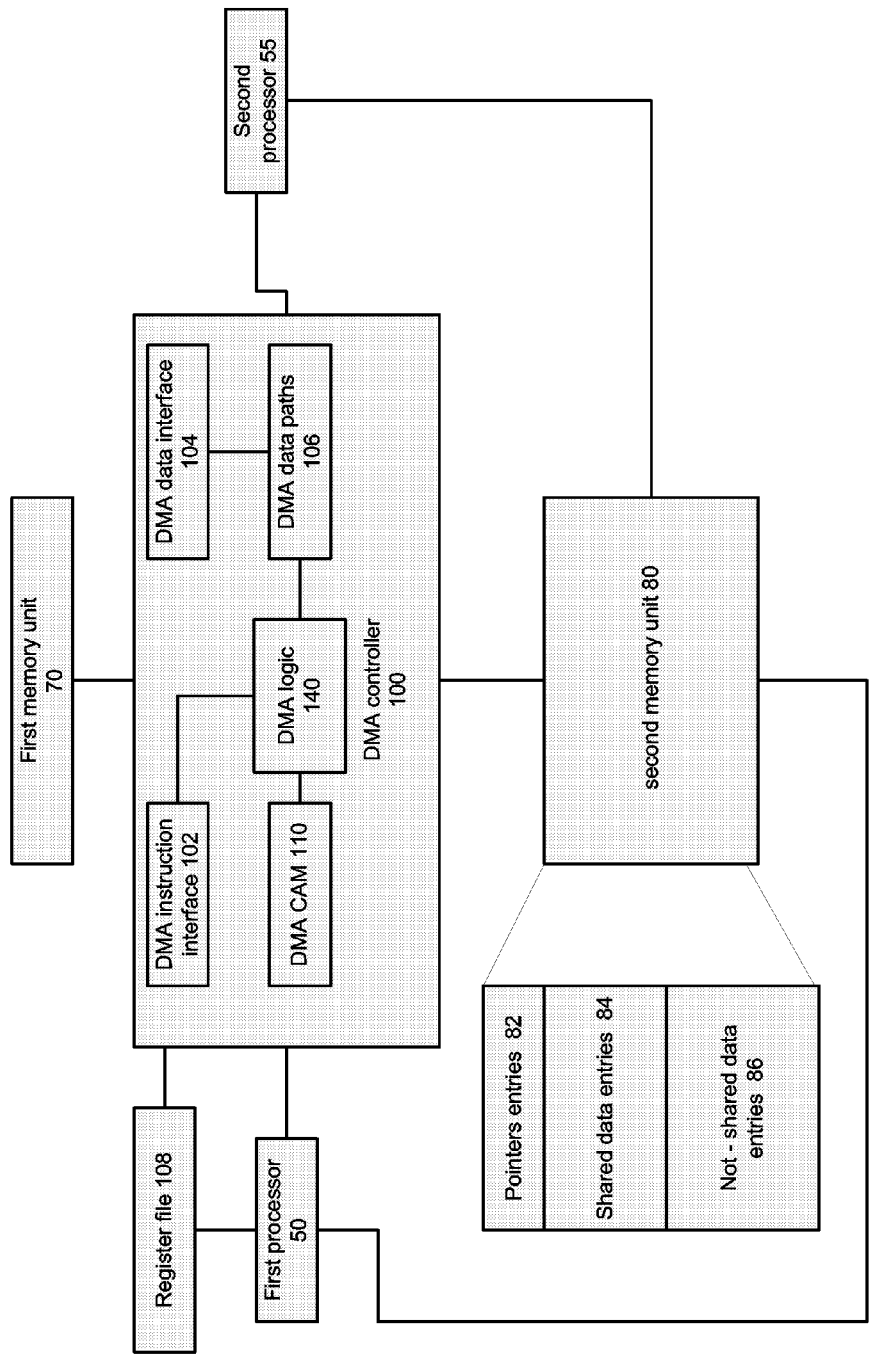
FIG. 2 illustrates a device, according to an embodiment of the invention.

FIG. 2 illustrates a device 10' according to an embodiment of the invention. Device 10' of FIG. 2 differs from device 10 of FIG. 1 by including a second processor 55 that is connected to the DMA controller 100 and to the second memory unit 80. It is noted that a single register file 108 is illustrated in FIG. 2 although each processor can have its own register file that can be accessed by DMA controller 100.

The DMA controller 100 can arbitrate between read and write requests generated by the first and second processors 50 and 55. It is noted that at least one additional interface can be allocated for the second processor 55 but this is not necessarily so.

Figure 3:
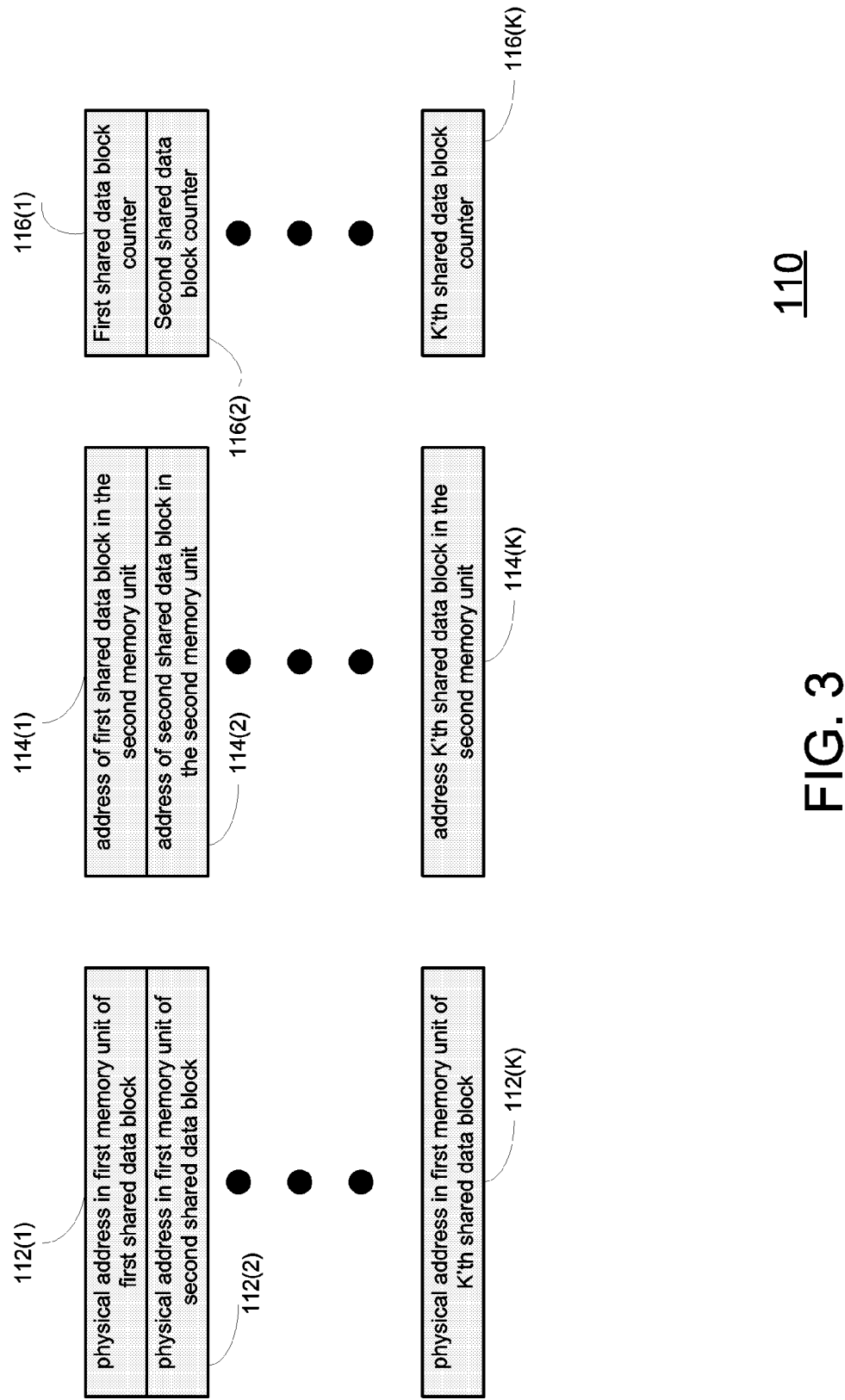
FIG. 3 illustrates a various data structures, according to an embodiment of the invention.

FIG. 3 illustrates data structures 112-116, according to an embodiment of the invention.

These data structures are maintained within the DMA controller 100. At least data structures 112 and 114 can be included within DMA CAM 110.

Data structure 112 (also referred to as shared data physical address array) includes multiple entries. An entry can be full or empty. The number of entries is limited to a predefined number of entries. Each entry can be associated with a certain shared data block. Accordingly, the DMA controller 100 supports a limited number of shared data blocks. If all the entries are full the DMA controller 100 is not able to support another shared data entry. The DMA controller 100 is regarded as full and requests to read new shared data blocks are rejected.

According to an embodiment of the invention the rejection can include performing a normal DMA operation.

Each entry out of entries 112(1)-112(K) stores a physical address (in the first memory unit 70) of a data block that can be shared by multiple entities. Once a data block is not used by any task the corresponding entry can be deleted and the physical address of a new shared data block can be entered into data structure 116.

The DMA logic 140 can assign consecutive entries in response to consecutive requests to read new shared data blocks, but this is not necessarily so.

Conveniently, when DMA controller 100 is initialized all the entries are empty. The first read data instructions causes the physical address of the requested data to be stored at the first entry 112(1) of data structure 112. The next shared data read instruction that includes a request to read the same shared data block will cause the DMA controller 100 to provide the shared data block from the second memory unit 80 and not from the first memory unit 70. After both tasks that requested to read that shared data block perform a shared data write operation (or otherwise indicate that that shared data block is not relevant) then that entry can be deleted.

Data structure 112 can be managed as a cyclic data structure, but this is not necessarily so.

Each entry of data structure 112 is associated with a corresponding entry of data structure 114 and with a corresponding entry of data structure 116. Data structure 114 stores the address of the shared data blocks within the second memory unit. Data structure 116 stores counters that count the number of tasks that are concurrently using the shared data block. A task or entity utilizes a shared data block if it has read the shared data block (or a portion of the shared data block) but did not write it back or otherwise indicate that it does not require the shared data block any more.

FIG. 3 illustrates K'th entries in each data structure (out of 112-116) that are associated with up to K shared data blocks. Data structure 112 includes entries 112(1)-112(K) that store the physical address in the first memory unit of the first till K'th shared data blocks. Data structure 114 includes entries 114(1)-114(K) that store the physical address in the second memory unit of the first till K'th shared data blocks.

Data structure 116 includes entries 116(1)-116(K) that store K counters indicating the number of tasks that use the shared data blocks.

It is noted that the shared data blocks can have the same size, but can differ from each other. It is further noted that the fetching of a single data block can require one or more direct access control operations.

Figure 4:
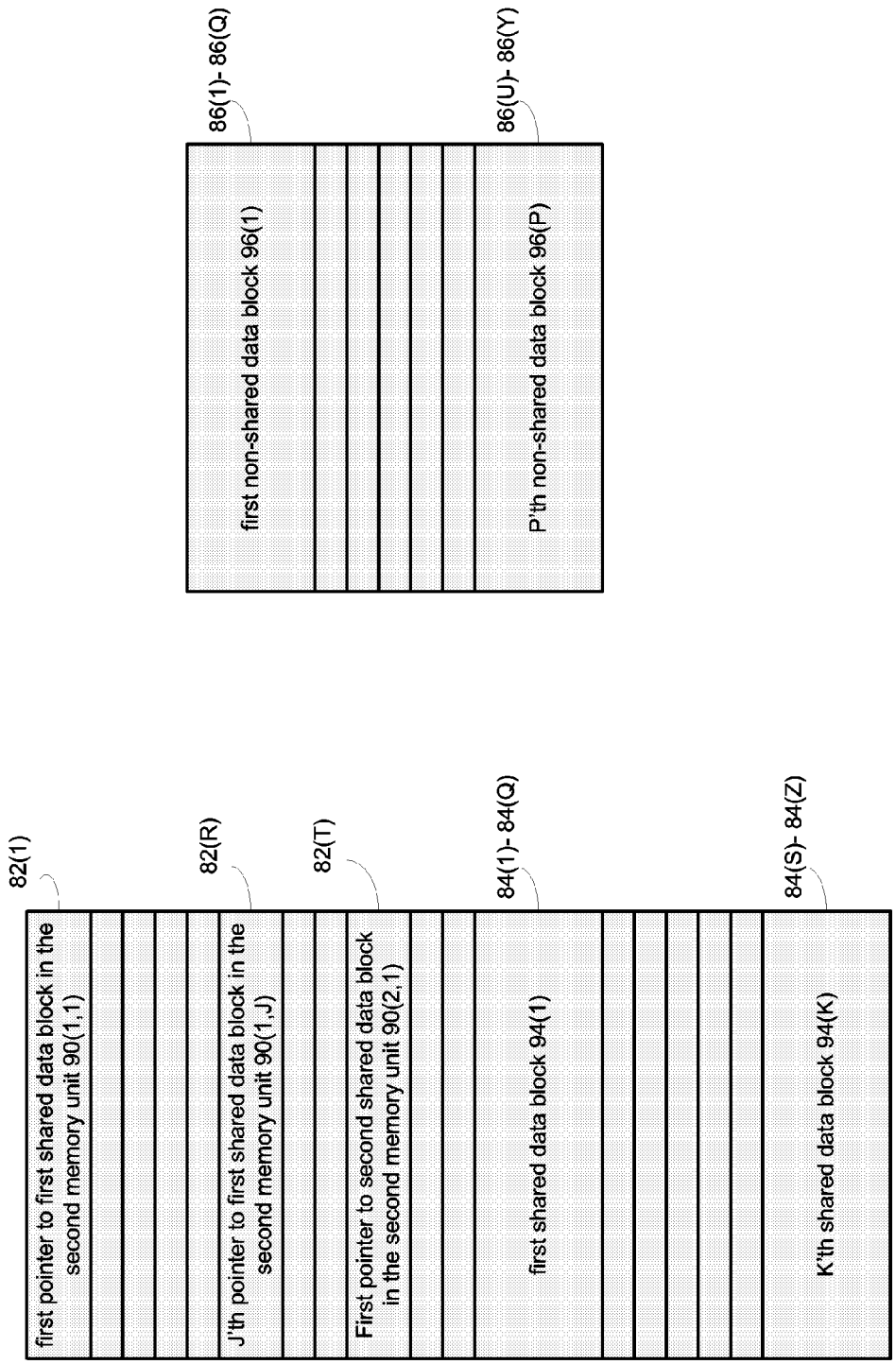
FIG. 4 illustrates other data structures, according to an embodiment of the invention.

FIG. 4 illustrates various data structures, according to an embodiment of the invention.

These data structures are maintained within the second memory unit 80. The second memory unit 80 may include many entries, such as pointer entries 82, shared data entries 84 and non-shared data entries 86.

The second memory unit can store additional data, and each of these mentioned above entry group can form a consecutive or non-consecutive memory space.

According to an embodiment of the invention the shared data blocks are stored in consecutive memory locations. Thus, only one pointer that points to the base address of the whole shared data block space should be supplied.

The pointer entries 82 can include multiple entries (such as entries 82(1), 82(R) and 82(T)) that store pointers to shared data blocks within the second memory group. Multiple tasks can request to transfer a shared data block that is stored at the same physical group at the first memory unit 70 to different virtual (or physical) locations within the second memory unit 80. Accordingly, each of these shared data read instruction will provide the same source address but different destinations. In these different destinations the DMA controller 100 stores pointers that point to the same address—the address of the shared data block within the second memory unit 80. This feature allows different tasks to use different target addresses (in shared read write operations) and to use different source addresses (in shared data write operations) while using the same shared data block.

Referring to FIG. 4, the first shared data block 94(1) is stored at entries 84(1)-84(Q). The K'th shared data block 94(K) is stored at entries 84(S)-84(Z). Entry 82(1) stores the first pointer to the first shared data block in the second memory unit 90(1,1). This pointer points to entry 84(1), which is the base address of the first shared data block 94(1). Alternatively, pointer 90(1,1) can point to other entries out of entries 84(1)-84(Q). Entry 82(R) stores the J'th pointer to the first shared data block in the second memory unit 90(1,1). This pointer also can point to any entry out of 84(1)-84(Q). Entry 82(T) stores the first pointer to the second shared data block in the second memory unit.

A first non-shared data block 96(1) is stored in entries 86(1)-86(Q) and the P'th non-shared data block 96(P) is stored at entries 86(U)-86(Y).

It is noted that indexes J, K, R, T, Q, S, Z, U, Y are positive integers. It is also noted that the same data block can be stored at second memory unit 80 as a shared data block and also stored as a non-shared data block, if it was read in response to a shard data read instruction and a non-shared data read instruction.

Figure 5:
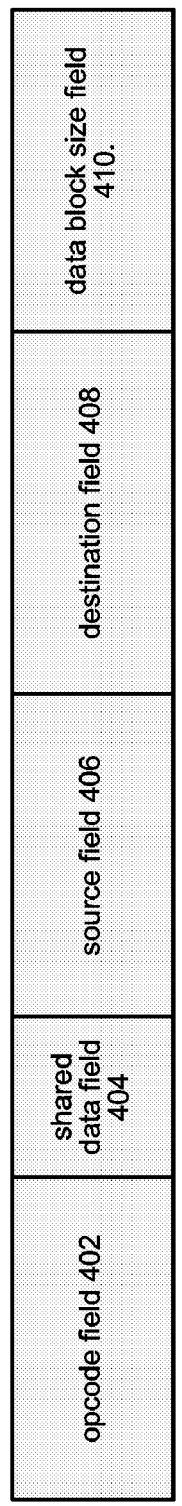
FIG. 5 illustrates a shared data read instruction, according to an embodiment of the invention.

FIG. 5 illustrates a direct memory access control instruction 400, according to an embodiment of the invention.

Instruction 400 includes opcode field 402, shared data field 404, source field 406, destination field 408 and data block size field 410.

Opcode field 402 defines whether the DMA instruction is a read or write instruction. The shared data field 404 indicates whether the instruction involves shard data or non-shared data. If the instruction is a read instruction this field is a shared data read instruction field. This field can also be regarded as a flag or a semaphore.

The source field 406 as well as the destination field 408 can include physical addresses but this is not necessarily so. For example, a shared data read instruction can include a destination address which is the physical address of a requested data block in the first memory unit 70. The destination field can indicate a location in the second memory unit. The DMA controller 100 will input into that location a pointer that will point to the location of the requested data at the second memory unit.

Figure 6:
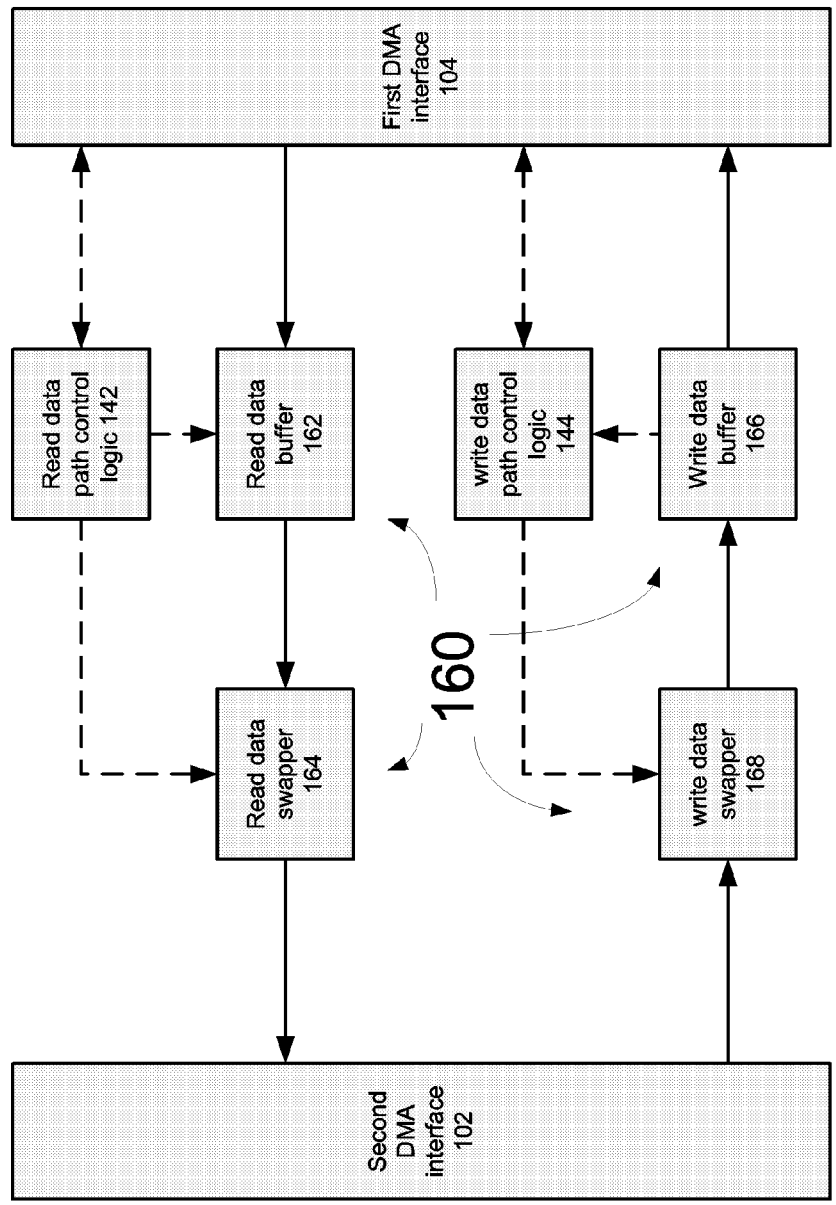
FIG. 6 illustrates data interfaces and data paths, according to an embodiment of the invention.

FIG. 6 illustrates data interfaces 104 and 102 and data path 160, according to an embodiment of the invention.

Data interfaces 104 and 102 can receive and provide data as well as various control signals to various components in data path 160 as well as to the first and second memory units 70 and 80.

Data paths are known in the art. They transfer data between multiple components and exchange signals that are dictated by the buses or the components that are connected to them.

Separate data paths for read and write instructions are illustrated in FIG. 6. The read data path includes a read data path control logic 142 that is connected to the first DMA interface 104, to a read data buffer 162 and to a read data swapper 164. The data passes from the first DMA data interface 104, to the read data buffer 162, the read data swapper to the second DMA interface 102.

The write data path includes write data path control logic 144 that is connected to the first DMA interface 104, to a write data buffer 166 and to a write data swapper 168. The data passes from the second DMA interface 102 to the write data swapper 168, to the write data buffer 166 and finally to the first DMA data interface 104.

Each control logic (142, 144) has an instruction queue and is adapted to receive read and write commands, execute them and receive indications that the commands were completed.

According to another embodiment of the invention control logics 142 and 144 share the same instruction queue.

Figure 7:
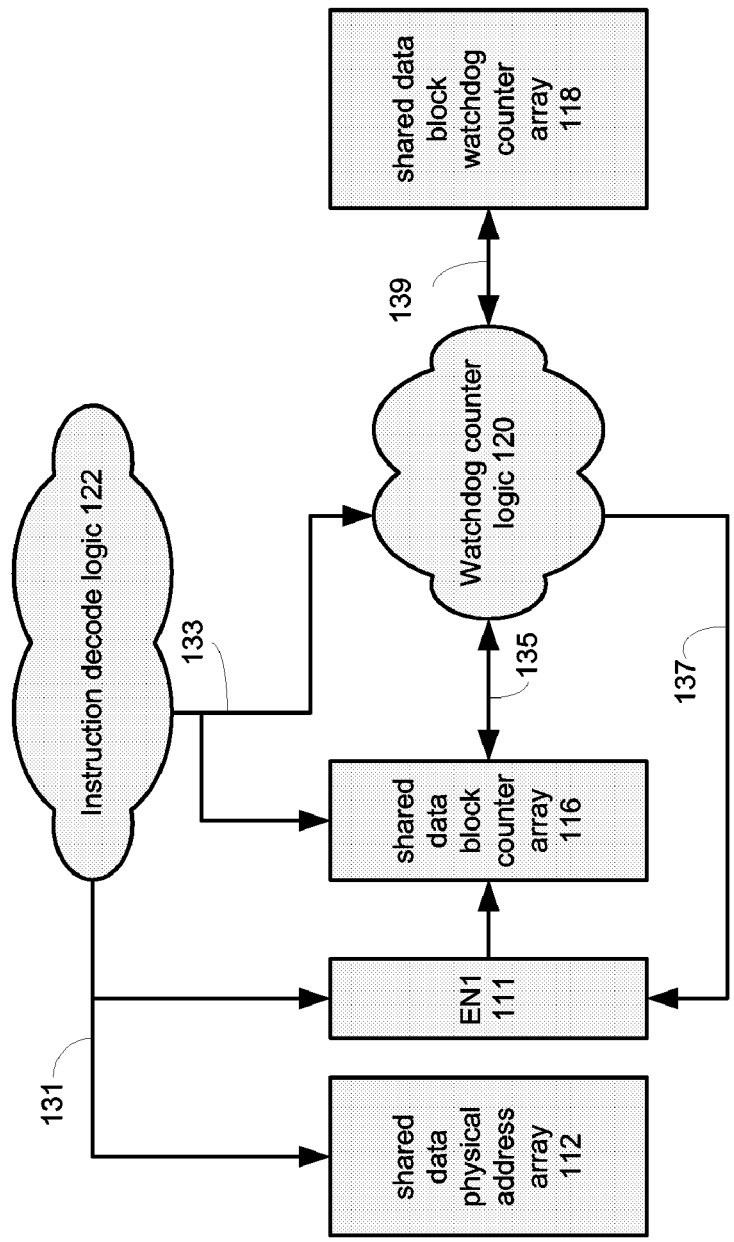
FIG. 7 illustrates a portion of a DMA logic, according to an embodiment of the invention.

FIG. 7 illustrates a portion 101 of DMA logic 100, according to an embodiment of the invention.

Portion 101 includes shared data physical address array 112, encoder ("EN1") 111, shared data block counter array 116, watchdog counter logic 120, shared data block watchdog counter array 118 and instruction decode logic 122.

The instruction decode logic 122 is connected via bus 131 to the shared data physical address array 112 and to the encoder ("EN1") 111. The instruction decode logic 122 is connected via bus 133 to the shared data block counter array 116 and the watchdog counter logic 120.

The watchdog counter logic 120 is connected via bus 139 to the shared data block watchdog counter array 118, via bus 137 to the encoder 111 and via bus 135 to the shared data block counter array 116. The shared data block counter array 116 is also connected to encoder 111.

Once DMA logic 100 receives an instruction it determines whether it is a shared or a non-shared data transfer instruction. Assuming, for example that the instruction is a shared data read instruction.

In such a case the instruction decode logic 122 compares between the addresses stored in the shared data physical address array 112 to the received source address.

Assuming that the 112(k) entry of array 112 stores a matching physical address then shared data block counter 116(k) is incremented by one, and watchdog counter 118(k) is reset to an initial value in order to start counting a time window. When that time window expires the value of counter 118(k) is decremented.

Assuming that no match was found within the shared data physical address array 112 and that array 112 is not full then the DMA logic 100 stores the new address in a vacant entry of array 112. It is assumed that it is the (k+1)'th entry. The DMA controller 100 then fetches the requested data block from the first memory unit 70, initializes watchdog counter 118(k+1) and stores a pointer that points to the shared data block at the destination address included within the instruction.

It is noted that whenever a shared data read or a shared data write instructions are received by the instruction decode logic 122 it updates the proper counter in the counter array. For example, a shared data read instruction of the S'th shared data block will increment counter 116(S) and initialize watchdog counter 118(S). A shared data write instruction of the S'th shared data block will decrement counter 116(S) and initialize watchdog counter 118(S).

The S'th data block can be overwritten when the value of counter 116(S) is zero.

TABLE 1 illustrates an exemplary instructions sequence that further explains the operation of DMA controller 100.

The instruction sequence includes two shared data read instructions (DMAr.sem 100,2000_000 and DMAr.sem 200, 2000_000) and two shared data write instructions (DMAw.sem 100,2000_000 and DMAw.sem 200,2000_000). The shared data read instruction include a source destination of 2000 0000 but have different destination addresses (100 and 200). During the execution of these shared data read instructions the DMA controller 100 writes in locations 100 and 200 of the second memory unit 80 the base address (2000) of the shared data block in the second memory unit 80.

It is assumed that before the first instruction the first entry 112(1) of array 112 includes physical address 1000 0000. The value of the first entry 114(1) of array 114 is address 1000. The first shared data block counter 116(1) differ from zero.

Communication engine 40 includes multiple communication controllers of different types. Each communication controller can manage one or more communication channels. Conveniently, each communication channel is associated with a single virtual buffer. A bi-directional communication channel is viewed as a combination of a receive communication channel and a transmit communication channel. Each such communication channel can have its own information transfer controller, virtual buffers, hardware Buffer, and the like.

It is noted that one or more communication channels can be controlled by a single information transfer controller, but this is not necessarily so.

The communication engine 40 includes two RISC processors 50 and 55, DMA controller 100, a shared data RAM memory unit 80, a shared instruction RAM memory unit 28, scheduler 24, two first level DMA controllers 252 and 254, a first memory unit 70, eight universal communication controllers denoted UCC1-UCC8 11-18, one multi-channel communication controller (MCC1) 19, two serial peripheral interfaces denoted SP1-SP2 21-22, and two communication interfaces 46 and 45. It is noted that additional components,

TABLE 1

|  | 114(1) | 116(1) | 114(2) | 116(2) | 118(2) | Remarks |
| --- | --- | --- | --- | --- | --- | --- |
| Initial state | 1000_0000 | 1000 | Empty | Empty | 0 |  |
| DMAr.sem 100,2000_000 | 1000_0000 | 1000 | 2000_0000 | 2000 | 1 | DMA operation. Value of entry 100 is 2000 |
| DMAr.sem 200,2000_000 | 1000_0000 | 1000 | 2000_0000 | 2000 | 2 | Value of entry 200 is 2000 |
| DMAw.sem 100,2000_000 | 1000_0000 | 1000 | 2000_0000 | 2000 | 1 |  |
| DMAw.sem 200,2000_000 | 1000_0000 | 1000 | 2000_0000 | 2000 | 0 |  |

Figure 8:
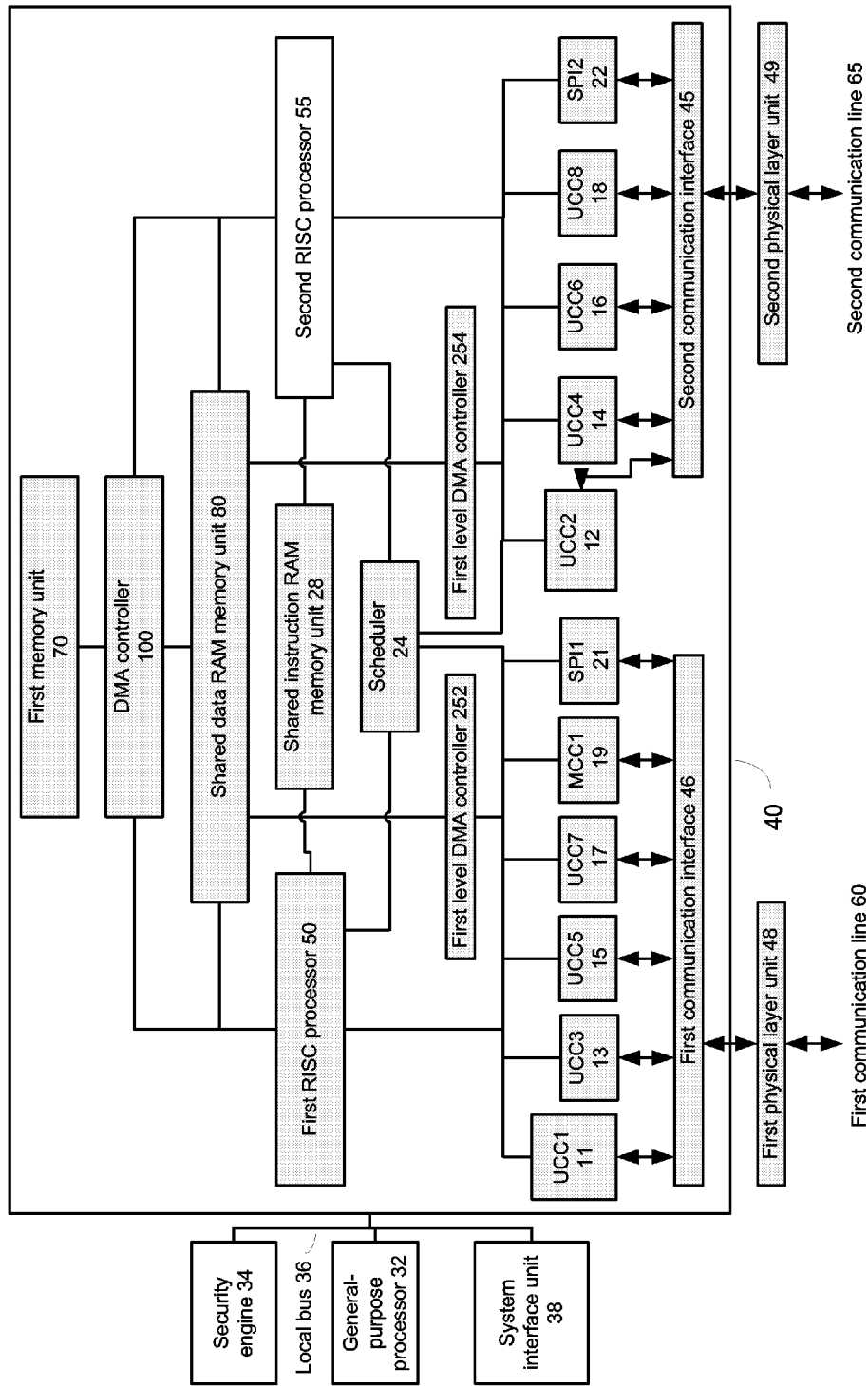
FIG. 8 illustrates a device, according to a further embodiment of the invention.

FIG. 8 illustrates a device 10", according to an embodiment of the invention.

Device 10" includes a general-purpose processor 32, a security engine 34, system interface unit 38, communication engine 40 and multiple ports (not shown). Components 32, 34, 38 and 30 are connected to each other by local bus 36.

The general-purpose processor 32 can include multiple execution units such as but not limited to an integer unit, a branch processing unit, a floating point unit, a load/store unit and a system register unit. It can also include various cache memories, dynamic power management unit, translation look aside buffers, and the like.

The general-purpose processor 32 controls device 10" and can execute various programs according to the required functionality of device 10". The general-purpose processor 32 can be a member of the PowerPC™ family but this is not necessarily so.

The security engine 34 can apply various security mechanisms including encryption based mechanisms and the like.

Device 10" can be connected to multiple memory units as well as other components. These components are interfaced by system interface unit 38. System interface unit 38 may include some of the following components:
external memory controllers, external DDR interface unit, PCI bridge, local bus, bus arbitrator, dual UART unit, dual I²C unit, a four channel DMA controller, an interrupt controller, and the like. It is noted that other interfacing components can be used.

Communication engine 40 is a versatile communication component that can manage multiple communication ports that operate according to different communication protocols.

such as but not limited to various ports, time slots assigners and the like were omitted for simplicity of explanation.

The first RISC processor 50 is connected to UCC1 11, UCC3 13, UCC5 15, UCC7 17, MCC1 19, SPI1 21, scheduler 24, shared instruction RAM memory unit 28 and shared data RAM memory unit 80. The access to the first RISC controller can be managed by scheduler 24.

The second RISC processor 55 is connected to UCC2 12, UCC4 14, UCC6 16, UCC8 18, SPI2 22, scheduler 24, shared instruction RAM memory unit 28 and shared data RAM memory unit 80. The access to the first RISC controller can be managed by scheduler 24.

The first level DMA controllers 252 and 254 are connected to the shared data RAM memory unit 80 and to information transfer controllers (not shown) within the various communication controllers.

Each communication controller out of communication controllers UCC1-UCC8 11-18, MCC1 19, and SPI1-SPI2 21-22 can include transmission paths as well as reception paths.

Conveniently, a UCC can support the following communication protocols and interfaces (not all simultaneously): 10/100 Mbps Ethernet, 1000 Mpbs Ethernet, IPv4 and IPv6, L2 Ethernet switching using, ATM protocol via UTOPIA interface, various types of HDLC, UART, and BISYNC.

Conveniently, MCC1 19 supports two hundred and fifty six HDLC or transparent channels, one hundred and twenty eight SS#7 channels or multiple channels that can be multiplexed to one or more TDM interfaces.

In addition, the communication engine 40 can include a controller (not shown) as well as an interrupt unit that coordinate the various components of the communication engine, as well as to enable the communication engine 40 to communicate with general-purpose processor 32, security engine 34 and system interface unit 36.

Conveniently, a group of communication controllers are connected to a single first level DMA controller, but this is not necessarily so. For example, first level DMA controller 252 serves communication controllers UCC1, UCC3, UCC5, UCC7, MCC1 and SPI1 11, 13, 15, 17, 19 and 21 respectively, while first level DMA controller 254 serves communication controllers UCC2, UCC4, UCC6, UCC8 and SPI2 12, 14, 16, 18 and 22 respectively.

The shared data RAM memory unit 80 is accessible by the various RISC processors 80 and acts as second memory unit 80 of previous drawings.

The first and second RISC processors 50 and 55 can send shared data transfer instructions to DMA controller 100.

Figure 9:
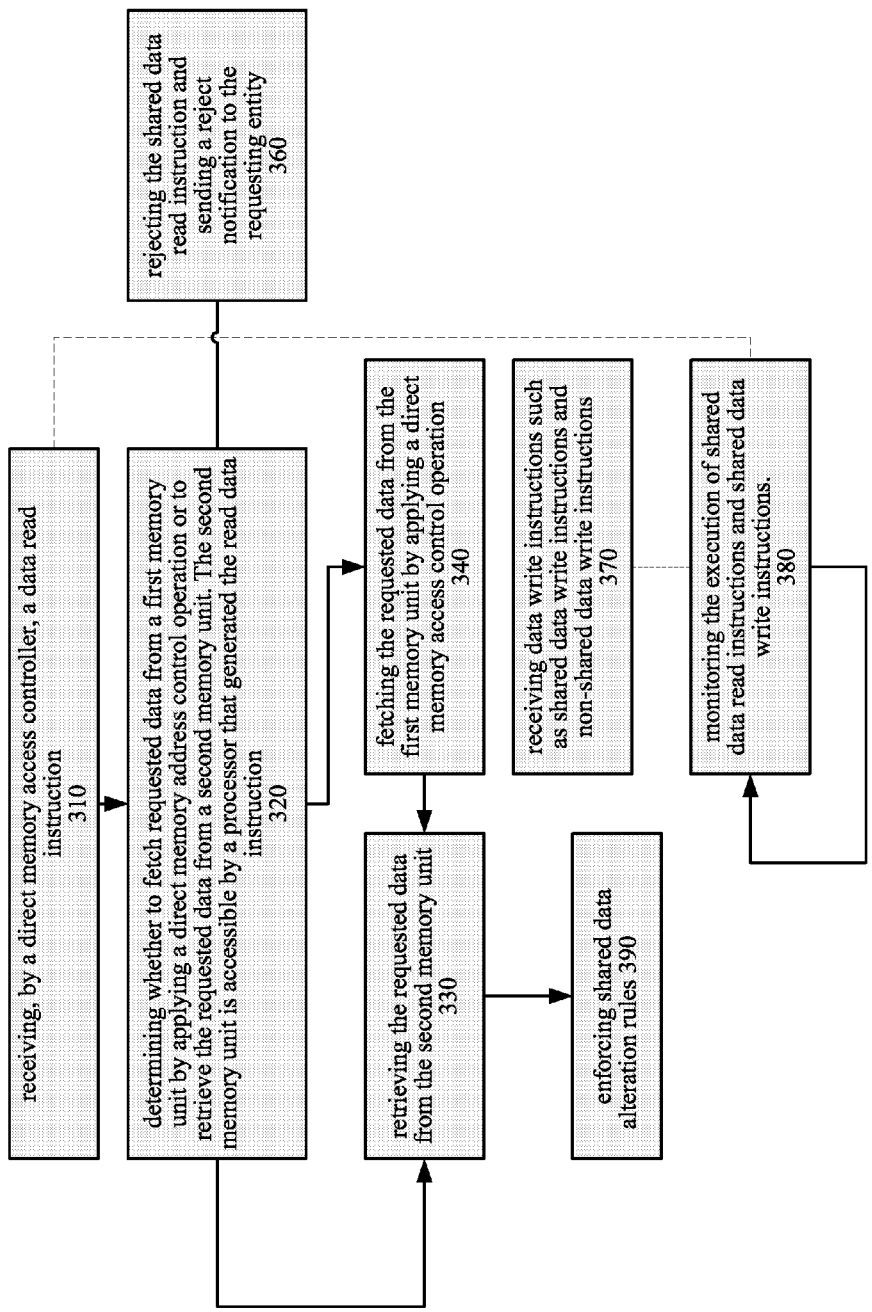
FIG. 9 is a flow chart of a method for data sharing, according to an embodiment of the invention.

FIG. 9 illustrates method 300 according to an embodiment of the invention.

Method 300 starts by stage 310 of receiving, by a direct memory access controller, a data read instruction. The data read instruction can be a shared data read instruction or a non-shared data read instruction. Referring to the example set forth in previous drawings, DMA controller 100 receives a data read instruction, such as data read instruction 400, from processor 100.

Conveniently method 300 also includes stage 370 of receiving data write instructions such as shared data write instructions and non-shared data write instructions.

It is noted that one or more processors can generated the various instructions. A single processor can execute multiple tasks, and multiple tasks can generate multiple data read and write instructions.

Conveniently, a hardware component or software that requests to read or write a data block is referred to as an entity.

Stage 310 is followed by stage 320 of determining whether to fetch requested data from a first memory unit by applying a direct memory address control operation or to retrieve the requested data from a second memory unit. The second memory unit is accessible by a processor that generated the read data instruction, thus the retrieval does not require additional time consuming direct memory access operations.

The determination of whether to fetch the data block or to retrieve the data block is responsive to the type of the data read instruction—whether it is a shared data read instruction or a non-shared data read instruction.

In addition—if the instruction is a shared data read instruction the following stage (fetching or retrieving) depends upon various factors such as whether the second memory unit already stores the requested shared data block.

Depending upon the determination, stage 320 can be followed by stage 330 or 340.

According to another embodiment of the invention stage 320 can also include determining whether to reject (not to execute) the data read instruction. A rejection can occur if the instruction is a shared data read instruction and at least one of the following conditions is fulfilled: (i) the requested shared data block is not stored in the second memory unit but the direct memory access controller can not support another shared data block, (ii) the number of entities that share the shared data block exceeds a threshold.

If the data read instruction is rejected stage 320 is followed by stage 360 of rejecting the shared data read instruction and sending a reject notification to the requesting entity.

Conveniently, stage 320 includes checking a value of a shared data read instruction field. This field can be also referred to as a flag or semaphore.

Conveniently, stage 320 includes checking a match between a physical address associated with the requested data block and a physical addresses associated with shared data blocks that are stored within the second direct memory access controller. The physical address is conveniently the physical address of the data block within the first memory unit.

Referring to the example set forth in previous drawings, DMA logic 100 checks if received instruction is a shared data read instruction, for example by checking the value of shared data field 404. If it is a shared data read instruction then DMA logic 100 further checks if the shared data physical address array 112 stores an address that matches the source address included within source field 406. If there is a match then stage 320 is followed by stage 330. Conveniently, if there is a match but the number of tasks that already share that shared data block (as indicated by the value of a counter within array 116) exceeds a predefined threshold then the shared data transfer can be rejected. If there is no match but DAM CAM 110 is full then the shared data transfer can be rejected.

Stage 330 includes retrieving the requested data from the second memory unit. Stage 330 is conveniently executed if the data read instruction is a shared data read instruction and if the requested data is stored in the second memory unit. Conveniently, after a successful execution of a shared data read operation a counter that stores the number of entities that share the requested data block is incremented.

Stage 340 includes fetching 340 the requested data from the first memory unit by applying a direct memory access control operation.

Referring to the example set forth in previous drawings, DMA logic 100 can fetch the shared data block from the first memory unit 70 by utilizing its interfaces and its read data path.

Stage 340 can be followed by stage 330.

Stage 340 can be followed by stage 390 of enforcing shared data alteration rules. Stage 390 may include preventing alterations of shared data. Stage 390 can include allowing only one entity to change the shared data at a time. If the data is modifies the other entities can be informed. The altered data can be written to the first memory unit or be stored, even within the direct access memory unit, at a location that is used to store non-shared data blocks. According to an embodiment of the invention different entities are allowed to change non-overlapping portions of the shared data block. Thus, one entity can change a first portion while another entity can change another portion.

Conveniently, method 300 further includes stage 380 of monitoring the execution of shared data read instructions and shared data write instructions.

A shared data write operation can include writing data to the first memory unit but this is not necessarily so. An entity can read a data block and once it does not need the data it can send a write instruction of the shared data to indicate that it does not need the shared data any more. By comparing between the read and write operations method 300 can determine if the shared data is still relevant. When the shared data is not read by any entity is can be erased or overwritten.

Referring to the example set forth in previous drawings, DMA logic 100 monitors the execution of read and write instructions by updating counters 116, updating watchdog counters 118 as well as checking their values.

According to an embodiment of the invention the monitoring includes limiting a time difference between a reception of a shared data read instruction and a completion of a corresponding shared data write instruction. Thus, if a predefined period lapses from a reception of a shared data instruction of a certain data block then the method assumes that that entity is not interested in that shared data entity any more. This can prevent situations in which a certain entity is stuck after reading a shared data. This can cause the method to conclude that the shared data is required, thus preventing the shared data from being overwritten.

According to an embodiment of the invention each read operation of shared data should be followed by a write operation, but this is not necessarily so. An entity that reads the shared data can indicate in other manners that it does not need the shared data any more.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A method comprising:
   receiving, by a direct memory access controller, a first shared data read instruction;
   determining whether to fetch a first requested data block from a first memory unit to a second memory unit, wherein the second memory unit is accessible by a processor that generated the shared data read instruction, and wherein the determining includes determining whether a first source address included in the first shared data read instruction is included in a shared data physical address array of the direct memory access controller; and
   in response to determining that the first source address is not included in the shared data physical address array:
      fetching the first requested data block from the first memory unit to the source address;
      storing the first requested data block at a first physical address in the second memory unit:
      storing a first pointer at a second physical address in the second memory unit, wherein the first pointer is to the first physical address and the second physical address is associated with a first destination address included in the first shared data read instruction; and
      storing the first source address in the shared data physical address array.

2. A device comprising:
   a first memory unit and at least one processor configured to access a second memory unit; and
   a direct memory access controller that is configured to:
      receive a first shared data read instruction
      determine whether to fetch a first requested data block from the first memory unit to the second memory unit, wherein the determining includes determining whether a first source address included in the first shared data read instruction is included in a shared data physical address array of the direct memory access controller; and
      in response to determining that the first source address is not included in the shared data physical address array, to:
         (iii) fetch the first requested data block from the first memory unit to the source address;
         store the first requested data block at a first physical address in the second memory unit;
         store a first pointer at a second physical address in the second memory unit, wherein the first pointer is to the first physical address and the second physical address is associated with a first destination address included in the first shared data read instruction; and
         store the first source address in the shared data physical address array.

3. The method of claim 1, wherein:
   in further response to determining that the first source address is not included in the shared data physical address array, the method comprises storing a count in a counter array of the direct memory access controller, wherein the count is associated with the first source address.

4. The method of claim 3, wherein
   in further response to determining that the first source address is not included in the shared data physical address array, the method comprises initializing a watchdog counter associated with the first source address.

5. The method of claim 4, further comprising:
   decrementing the count in response to the watchdog counter counting a time window.

6. The method of claim 3, further comprising:
   receiving by the direct memory access controller a second shared data read instruction;
   determining that a second source address included in the second shared data read instruction is the same as the first source address; and
   in response to determining that the second source address is the same as the first source address:
      storing a second pointer at a third physical address in the second memory unit, wherein the second pointer is to the first physical address and the third physical address is associated with a second destination address included in the second shared data read instruction; and
      incrementing the count.

7. The method of claim 6, further comprising:
   receiving by the direct memory access controller a shared data write instruction;
   determining that a third source address included in the shared data write instruction is the same as the first source address; and
   in response to determining that the third source address is the same as the first source address, decrementing the count.

8. The method of claim 1, further comprising:
   in response to determining that the first source address is included in the shared data physical address array, storing a second pointer at a third physical address in the second memory unit, wherein the second pointer is to the first physical address and the third physical address is associated with the first destination address.

9. The method of claim 8, wherein:
   in further response to determining that the first source address is included in the shared data physical address array, the method comprises incrementing a count in a counter array of the direct memory access controller, wherein the count is changed based upon accesses to the first source address.

10. The device of claim 2, wherein:
    in further response to determining that the first source address is not included in the shared data physical address array, the direct memory access controller is further configured to store a count in a counter array of the direct memory access controller, wherein the count is associated with the first source address.

11. The device of claim 10, wherein
in further response to determining that the first source address is not included in the shared data physical address array, the direct memory access controller is further configured to initialize a watchdog counter associated with the first source address.

12. The device of claim 11, wherein:
the direct memory access controller is further configured to decrement the count in response to the watchdog counter counting a time window.

13. The device of claim 10, wherein the direct memory access controller is further configured to:
receive from the processor a second shared data read instruction;
determine that a second source address included in the second shared data read instruction is the same as the first source address; and
in response to determining that the second source address is the same as the first source address:
store a second pointer at a third physical address in the second memory unit, wherein the second pointer is to the first physical address and the third physical address is associated with a second destination address included in the second shared data read instruction; and
increment the count.

14. The device of claim 13, wherein the direct memory access controller is further configured to:
receive by the direct memory access controller a shared data write instruction;
determine that a third source address included in the shared data write instruction is the same as the first source address; and
in response to determining that the third source address is the same as the first source address, decrement the count.

15. The device of claim 2, wherein:
in response to determining that the first source address is included in the shared data physical address array, the direct memory access controller is further configured to store a second pointer at a third physical address in the second memory unit, wherein the second pointer is to the first physical address and the third physical address is associated with the first destination address.

16. The device of claim 15, wherein:
in further response to determining that the first source address is included in the shared data physical address array, the direct memory access controller is further configured to increment a count in a counter array of the direct memory access controller, wherein the count is changed based upon accesses to first source address.

17. A direct memory access controller comprising a controller configured to:
receive from the processor an instruction;
determine that the instruction is a shared data instruction based upon a shared data field of the instruction;
if the instruction is a shared data instruction, fetch a data block stored at a location in a first memory unit that is designated by a source field of the instruction and store the data block in a second memory unit at a first location in the second memory unit that is reserved for shared data; and
if the instruction is not a shared data instruction, fetch the data block and store the data block in the second memory unit at a second location in the second memory unit that is reserved for non-shared data, wherein the second location is designated by a destination field of the instruction;
wherein, if the instruction is a shared data instruction, the controller is further configured to store a pointer to the first location at a third location in the second memory unit, wherein the third location is designated by the destination field; and if the instruction is a shared data instruction, the controller is further configured to store the source field in an address array of the direct memory access controller.

18. The direct memory access controller of claim 17, wherein, if the instruction is a shared data instruction, the controller is further configured to initialize a watchdog counter.

* * * * *